US010851225B2

(12) United States Patent
Sugawara et al.

(10) Patent No.: US 10,851,225 B2
(45) Date of Patent: Dec. 1, 2020

(54) NITRILE GROUP-CONTAINING HIGHLY SATURATED COPOLYMER RUBBER, CROSS-LINKABLE RUBBER COMPOSITION, AND CROSS-LINKED RUBBER

(71) Applicant: ZEON CORPORATION, Tokyo (JP)

(72) Inventors: Shinsuke Sugawara, Tokyo (JP); Akito Nakai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 20 days.

(21) Appl. No.: 15/748,340

(22) PCT Filed: Jul. 27, 2016

(86) PCT No.: PCT/JP2016/072071
§ 371 (c)(1),
(2) Date: Jan. 29, 2018

(87) PCT Pub. No.: WO2017/022598
PCT Pub. Date: Feb. 9, 2017

(65) Prior Publication Data
US 2018/0215906 A1 Aug. 2, 2018

(30) Foreign Application Priority Data

Aug. 5, 2015 (JP) .................. 2015-154794

(51) Int. Cl.
| | | |
|---|---|---|
| *C08L 15/00* | (2006.01) | |
| *C08F 236/14* | (2006.01) | |
| *C08K 3/04* | (2006.01) | |
| *C08K 3/36* | (2006.01) | |
| *C08K 5/11* | (2006.01) | |
| *C08K 5/14* | (2006.01) | |
| *C08L 9/02* | (2006.01) | |

(52) U.S. Cl.
CPC .......... *C08L 15/005* (2013.01); *C08F 236/14* (2013.01); *C08K 3/04* (2013.01); *C08K 3/36* (2013.01); *C08K 5/11* (2013.01); *C08K 5/14* (2013.01); *C08L 9/02* (2013.01); *C08L 15/00* (2013.01)

(58) Field of Classification Search
CPC .......... C08L 15/005; C08L 9/02; C08L 15/00; C08F 236/14; C08K 3/04; C08K 3/36; C08K 5/11; C08K 5/14

USPC ......................................................... 526/329
See application file for complete search history.

(56) References Cited

U.S. PATENT DOCUMENTS

| | | | | |
|---|---|---|---|---|
| 4,654,404 | A * | 3/1987 | Watanabe ................ | C08L 9/02 524/205 |
| 4,965,323 | A * | 10/1990 | Watanabe ............... | C08C 19/02 525/349 |
| 5,162,438 | A * | 11/1992 | Tsuji ...................... | C09J 115/00 525/113 |
| 6,548,604 | B1 | 4/2003 | Kotsuji et al. | |
| 2009/0186977 | A1 | 7/2009 | Nagamori et al. | |
| 2013/0280459 | A1 * | 10/2013 | Nakashima ............. | C08L 13/00 428/36.8 |
| 2015/0050554 | A1 | 2/2015 | Fukumine et al. | |
| 2015/0246991 | A1 * | 9/2015 | Mori ..................... | C08F 236/12 525/329.3 |
| 2016/0297955 | A1 | 10/2016 | Inoue et al. | |
| 2018/0134831 | A1 | 5/2018 | Shiono | |

FOREIGN PATENT DOCUMENTS

| | | | |
|---|---|---|---|
| JP | 2001-114940 A | | 4/2001 |
| JP | 2013-008485 A | | 1/2013 |
| WO | 2013/080989 A1 | | 6/2013 |
| WO | WO 2014/050853 A1 | * | 4/2014 |
| WO | 2015/080130 A1 | | 6/2015 |
| WO | 2016/190213 A1 | | 12/2016 |

OTHER PUBLICATIONS

Feb. 5, 2019 Search Report issued European Patent Application No. 16832877.1.
Feb. 6, 2018 International Preliminary Report on Patentability issued in International Patent Application No. PCT/JP2016/072071.
Oct. 4, 2016 Search Report issued in International Patent Application No. PCT/JP2016/072071.

* cited by examiner

*Primary Examiner* — Kelechi C Egwim
(74) *Attorney, Agent, or Firm* — Oliff PLC

(57) ABSTRACT

The present invention provides a nitrile group-containing highly saturated copolymer rubber comprising an α,β-ethylenically unsaturated nitrile monomer unit (a1) in a content of 10 to 40 wt %, an α,β-ethylenically unsaturated monocarboxylic acid ester monomer unit (a2) in a content of 10 to 60 wt %, and a conjugated diene monomer unit (a3) in a content of 20 to 70 wt %, and having an iodine value of 35 to 85.

20 Claims, No Drawings

NITRILE GROUP-CONTAINING HIGHLY SATURATED COPOLYMER RUBBER, CROSS-LINKABLE RUBBER COMPOSITION, AND CROSS-LINKED RUBBER

TECHNICAL FIELD

The present invention relates to a nitrile group-containing highly saturated copolymer rubber that gives a cross-linked rubber good in original state physical properties and excellent in heat resistance, compression set resistance, and cold resistance, as well as a cross-linkable rubber composition and a cross-linked rubber obtained by using the nitrile group-containing highly saturated copolymer rubber.

BACKGROUND ART

A nitrile group-containing highly saturated copolymer rubber typified by a hydrogenated acrylonitrile-butadiene copolymer rubber is excellent in heat resistance, oil resistance, ozone resistance and the like as compared with a common nitrile group-containing copolymer rubber having a plenty of carbon-carbon unsaturated bonds in the main chain structure thereof, such as an acrylonitrile-butadiene copolymer rubber, and is therefore often used in various fuel oil hoses, O-rings, belts-in-oil, and the like for automobiles.

As such a nitrile group-containing highly saturated copolymer rubber, Patent Document 1 proposes a nitrile group-containing highly saturated copolymer rubber comprising an α,β-ethylenically unsaturated nitrile unit (a), an α,β-ethylenically unsaturated carboxylic acid ester unit (b), a conjugated diene unit (c), and a saturated conjugated diene unit (d) each in a specific proportion, wherein the proportion of the saturated conjugated diene unit (d) to the total proportion of the conjugated diene unit (c) and the saturated conjugated diene unit (d) is 70 wt % or more, and the difference between the extrapolated glass transition start temperature (Tig) and the extrapolated glass transition end temperature (Teg) is 10° C. or less.

In the nitrile group-containing highly saturated copolymer rubber disclosed in Patent Document 1, the proportion of the content of the saturated conjugated diene unit (c) to the total content of the conjugated diene unit (c) and the saturated conjugated diene unit (d) is as high as 70 wt % or more, in particular 80 wt % or more, and the iodine value is thus low. According to Patent Document 1, adopting such a configuration makes it possible to provide a cross-linked rubber that is excellent in cold resistance, oil resistance, and dynamic characteristics.

RELATED ART DOCUMENTS

Patent Documents

Patent Document 1: Japanese Patent Laid-Open No. 2001-114940

SUMMARY OF THE INVENTION

Problem to be Solved by the Invention

The nitrile group-containing highly saturated copolymer rubber described in Patent Document 1 has a TR10 of −36° C. or lower (the temperature at which the length of a test piece is contracted (recovered) by 10% due to the temperature increase after the cross-linked rubber is frozen), which is a measure of cold resistance, and is excellent in TR10. On the other hand, seal members used in low-temperature environments are required that, in addition to sufficiently low TR10, the difference between TR10 and TR70 (the temperature at which the length of a test piece is contracted (recovered) by 70% due to the temperature increase after the cross-linked rubber is frozen) is as small as possible.

Under this circumstance, the nitrile group-containing highly saturated copolymer rubber described in Patent Document 1 has sufficiently low TR10, but has relatively high TR70 and a relatively large difference between TR10 and TR70, thus posing the following problem. Specifically, the nitrile group-containing highly saturated copolymer rubber described in Patent Document 1 has sufficiently low TR10 and, accordingly, has the advantage of being unlikely to break even when receiving an impact in low-temperature environments (excellent in low-temperature embrittlement resistance). But the nitrile group-containing highly saturated copolymer rubber described in Patent Document 1 has high TR70, and thus the sealing properties in low-temperature environments are not necessarily sufficient. Therefore the nitrile group-containing highly saturated copolymer rubber described in Patent Document 1 may be unsuitable for application to such seal members that will be used in low-temperature environments.

The present invention was made in view of such a circumstance, and an object is to provide a nitrile group-containing highly saturated copolymer rubber that gives a cross-linked rubber excellent in heat resistance, compression set resistance, and cold resistance, as well as a cross-linkable rubber composition and a cross-linked rubber obtained by using the nitrile group-containing highly saturated copolymer rubber. In particular, an object of the present invention is to provide a cross-linked rubber wherein, concerning cold resistance, TR10 is sufficiently low and, in addition, the difference between TR10 and TR70 (TR70-TR10) is small.

Means for Solving the Problem

As a result of a diligent study to achieve the above object, the present inventors have found that the above object can be achieved with a nitrile group-containing highly saturated copolymer rubber comprising an α,β-ethylenically unsaturated nitrile monomer unit, an α,β-ethylenically unsaturated monocarboxylic acid ester monomer unit, and a conjugated diene monomer unit in a specific ratio and having an iodine value of 35 to 85, and thus have perfected the present invention.

Specifically, the present invention provides a nitrile group-containing highly saturated copolymer rubber comprising an α,β-ethylenically unsaturated nitrile monomer unit (a1) in a content of 10 to 40 wt %, an α,β-ethylenically unsaturated monocarboxylic acid ester monomer unit (a2) in a content of 10 to 60 wt %, and a conjugated diene monomer unit (a3) in a content of 20 to 70 wt %, and having an iodine value of 35 to 85.

In the nitrile group-containing highly saturated copolymer rubber of the present invention, the α,β-ethylenically unsaturated monocarboxylic acid ester monomer unit (a2) is preferably a n-butyl acrylate unit and/or a methoxyethyl acrylate unit.

The present invention also provides a cross-linkable rubber composition comprising the nitrile group-containing highly saturated copolymer rubber and a cross-linking agent.

In the cross-linkable rubber composition of the present invention, the cross-linking agent is an organic peroxide cross-linking agent.

The cross-linkable rubber composition of the present invention preferably further comprises a plasticizer, and the plasticizer is preferably an adipic acid ether ester-based plasticizer and/or a polyether ester-based plasticizer. The content of the plasticizer is preferably 3 to 30 parts by weight in relation to 100 parts by weight of the nitrile group-containing highly saturated copolymer rubber.

The cross-linkable rubber composition of the present invention preferably further comprises a reinforcing agent, and the reinforcing agent is preferably carbon black and/or silica. The content of the reinforcing agent is preferably 5 to 300 parts by weight in relation to 100 parts by weight of the nitrile group-containing highly saturated copolymer rubber.

The present invention also provides a cross-linked rubber obtained by cross-linking the cross-linkable rubber composition.

The present invention also provides a shock absorber seal comprising the cross-linked rubber.

Effects of Invention

The present invention can provide a nitrile group-containing highly saturated copolymer rubber that gives a cross-linked rubber good in original state physical properties and excellent in heat resistance, compression set resistance, and cold resistance, as well as a cross-linkable rubber composition and a cross-linked rubber obtained by using the nitrile group-containing highly saturated copolymer rubber. In particular, the present invention can provide a nitrile group-containing highly saturated copolymer rubber that gives a cross-linked rubber wherein, concerning cold resistance, TR10 is sufficiently low and, in addition, the difference between TR10 and TR70 (TR70-TR10) is small, as well as a cross-linkable rubber composition and a cross-linked rubber obtained by using the nitrile group-containing highly saturated copolymer rubber.

DESCRIPTION OF EMBODIMENTS

Nitrile Group-Containing Highly Saturated Copolymer Rubber

The nitrile group-containing highly saturated copolymer rubber of the present invention comprises an $\alpha,\beta$-ethylenically unsaturated nitrile monomer unit (a1) in a content of 10 to 40 wt %, an $\alpha,\beta$-ethylenically unsaturated monocarboxylic acid ester monomer unit (a2) in a content of 10 to 60 wt %, and a conjugated diene monomer unit (a3) in a content of 20 to 70 wt %, and having an iodine value within the range of 35 to 85.

The $\alpha,\beta$-ethylenically unsaturated nitrile monomer forming the $\alpha,\beta$-ethylenically unsaturated nitrile monomer unit (a1) is not particularly limited so long as the $\alpha,\beta$-ethylenically unsaturated nitrile monomer is an $\alpha,\beta$-ethylenically unsaturated compound having a nitrile group. For example, acrylonitrile; $\alpha$-halogenoacrylonitriles such as $\alpha$-chloroacrylonitrile and $\alpha$-bromoacrylonitrile; $\alpha$-alkylacrylonitriles such as methacrylonitrile and ethacrylonitrile, etc. may be mentioned. Among these, acrylonitrile and methacrylonitrile are preferable, and acrylonitrile is particularly preferable. As the $\alpha,\beta$-ethylenically unsaturated nitrile monomer, a plurality of types of these may be used in combination.

In the nitrile group-containing highly saturated copolymer rubber of the present invention, the content of the $\alpha,\beta$-ethylenically unsaturated nitrile monomer unit (a1) is 10 to 40 wt %, preferably 13 to 30 wt %, and more preferably 15 to 25 wt %, in all the monomer units. When the content of the $\alpha,\beta$-ethylenically unsaturated nitrile monomer unit (a1) is too small, the oil resistance and the cold resistance (in particular, TR10 and TR70) of the obtained cross-linked rubber decrease. On the other hand, when the content of the $\alpha,\beta$-ethylenically unsaturated nitrile monomer unit (a1) is too large, the rubber cold resistance (in particular, TR70) of the obtained cross-linked rubber decreases.

The $\alpha,\beta$-ethylenically unsaturated monocarboxylic acid ester monomer forming the $\alpha,\beta$-ethylenically unsaturated monocarboxylic acid ester monomer unit (a2) is not particularly limited, but, for example, $\alpha,\beta$-ethylenically unsaturated monocarboxylic acid alkyl ester monomers, $\alpha,\beta$-ethylenically unsaturated monocarboxylic acid alkoxyalkyl ester monomers, $\alpha,\beta$-ethylenically unsaturated monocarboxylic acid aminoalkyl ester monomers, $\alpha,\beta$-ethylenically unsaturated monocarboxylic acid hydroxyalkyl ester monomers, $\alpha,\beta$-ethylenically unsaturated monocarboxylic acid fluoroalkyl ester monomers, etc. may be mentioned.

Among these, $\alpha,\beta$-ethylenically unsaturated monocarboxylic acid alkyl ester monomers or $\alpha,\beta$-ethylenically unsaturated monocarboxylic acid alkoxyalkyl ester monomers are preferable.

As $\alpha,\beta$-ethylenically unsaturated monocarboxylic acid alkyl ester monomers, those having as the alkyl group an alkyl group having 3 to 10 carbon atoms are preferable, those having an alkyl group having 3 to 8 carbon atoms are more preferable, and those having an alkyl group having 4 to 6 carbon atoms are still more preferable.

As specific examples of the $\alpha,\beta$-ethylenically unsaturated monocarboxylic acid alkyl ester monomers, acrylic acid alkyl ester monomers such as propyl acrylate, n-butyl acrylate, n-pentyl acrylate, and 2-ethylhexyl acrylate; acrylic acid cycloalkyl ester monomers such as cyclopentyl acrylate and cyclohexyl acrylate; acrylic acid alkylcycloalkyl ester monomers such as methylcyclopentyl acrylate, ethylcyclopentyl acrylate, and methylcyclohexyl acrylate; methacrylic acid alkyl ester monomers such as propyl methacrylate, n-butyl methacrylate, n-pentyl methacrylate, and n-octyl methacrylate; methacrylic acid cycloalkyl ester monomers such as cyclopentyl methacrylate, cyclohexyl methacrylate, and cyclopentyl methacrylate; methacrylic acid alkylcycloalkyl ester monomers such as methylcyclopentyl methacrylate, ethylcyclopentyl methacrylate, and methylcyclohexyl methacrylate; crotonic acid alkyl ester monomers such as propyl crotonate, n-butyl crotonate, and 2-ethylhexyl crotonate; crotonic acid cycloalkyl ester monomers such as cyclopentyl crotonate, cyclohexyl crotonate, and cyclooctyl crotonate; crotonic acid alkylcycloalkyl ester monomers such as methylcyclopentyl crotonate and methylcyclohexyl crotonate; etc. may be mentioned.

As $\alpha,\beta$-ethylenically unsaturated monocarboxylic acid alkoxyalkyl ester monomers, those having as the alkoxyalkyl group an alkoxyalkyl group having 2 to 8 carbon atoms are preferable, those having an alkoxyalkyl group having 2 to 6 carbon atoms are more preferable, and those having an alkoxyalkyl group having 2 to 4 carbon atoms are still more preferable.

As specific examples of the $\alpha,\beta$-ethylenically unsaturated monocarboxylic acid alkoxyalkyl ester monomers, acrylic acid alkoxyalkyl ester monomers such as methoxymethyl acrylate, methoxyethyl acrylate, ethoxymethyl acrylate, ethoxyethyl acrylate, n-propoxyethyl acrylate, i-propoxyethyl acrylate, n-butoxyethyl acrylate, i-butoxyethyl acrylate, t-butoxyethyl acrylate, methoxypropyl acrylate, and methoxybutyl acrylate; methacrylic acid alkoxyalkyl ester monomers such as methoxymethyl methacrylate, methoxyethyl methacrylate, ethoxymethyl methacrylate, ethoxyethyl methacrylate, n-propoxyethyl methacrylate, i-propoxyethyl methacrylate, n-butoxyethyl methacrylate, i-butoxyethyl methacrylate, t-butoxyethyl methacrylate, methoxypropyl methacrylate, and methoxybutyl methacrylate; etc. may be mentioned.

Among these, $\alpha,\beta$-ethylenically unsaturated monocarboxylic acid ester monomers, from the viewpoint of being capable of making the effects of the present invention more remarkable, acrylic acid alkyl ester monomers and acrylic acid alkoxyalkyl ester monomers are preferable, n-butyl acrylate and methoxyethyl acrylate are more preferable, and n-butyl acrylate is particularly preferable.

In the nitrile group-containing highly saturated copolymer rubber of the present invention, the content of the $\alpha,\beta$-ethylenically unsaturated monocarboxylic acid ester monomer unit (a2) is 10 to 60 wt %, preferably 25 to 45 wt %, and more preferably 30 to 40 wt %. When the content of the $\alpha,\beta$-ethylenically unsaturated monocarboxylic acid ester monomer unit (a2) is too small or too large, the cold resistance (in particular, TR10 and TR70) of the obtained cross-linked rubber decreases.

As the conjugated diene monomer forming the conjugated diene monomer unit (a3), 1,3-butadiene, isoprene, 2,3-dimethyl-1,3-butadiene, 1,3-pentadiene, etc. may be mentioned. Among these, 1,3-butadiene is preferable.

In the nitrile group-containing highly saturated copolymer rubber of the present invention, the content of the conjugated diene monomer unit (a3) (including those saturated) is 20 to 70 wt %, preferably 30 to 60 wt %, and more preferably 40 to 50 wt %, in all the monomer units. When the content of the conjugated diene monomer unit (a3) is too small, the rubber elasticity of the obtained cross-linked rubber decreases. On the other hand, when the content is too large, the chemical stability of the obtained cross-linked rubber may be impaired.

The nitrile group-containing highly saturated copolymer rubber of the present invention may also include, in addition to the above-mentioned monomer units, units of other monomer which can copolymerize with the monomers which form these monomer units. As such other monomers which can copolymerize, an $\alpha,\beta$-ethylenically unsaturated dicarboxylic acid monoester monomer, an $\alpha,\beta$-ethylenically unsaturated dicarboxylic acid diester monomer, $\alpha,\beta$-ethylenically unsaturated monocarboxylic acid monomer, $\alpha,\beta$-ethylenically unsaturated polyvalent carboxylic acid monomer, $\alpha,\beta$-ethylenically unsaturated polyvalent carboxylic acid anhydride monomer, conjugated diene monomer, $\alpha$-olefin monomer, aromatic vinyl monomer, fluorine-containing vinyl monomer, copolymerizable antiaging agent, etc. may be mentioned.

As the $\alpha,\beta$-ethylenically unsaturated dicarboxylic acid monoester monomer, maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleic acid; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate; fumaric acid monocyloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, monopropyl citraconate, and citraconic acid mono-n-butyl; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate, and monoethyl cyclohexyl itaconate; etc. may be mentioned.

As the $\alpha,\beta$-ethylenically unsaturated dicarboxylic acid diester monomer, a maleic acid dialkyl ester having alkyl groups having 1 to 18 carbon atoms such as dimethyl maleate and di-n-butyl maleate; a fumaric acid dialkyl ester having alkyl groups having 1 to 18 carbon atoms such as dimethyl fumarate and di-n-butyl fumarate; a maleic acid dicycloalkyl ester having cycloalkyl groups having 4 to 16 carbon atoms such as dicyclopentyl maleate and dicyclohexyl maleate; a fumaric acid dicycloalkyl ester having cycloalkyl groups having 4 to 16 carbon atoms such as dicyclopentyl fumarate and dicyclohexyl fumarate; an itaconic acid dialkyl ester having alkyl groups having 1 to 18 carbon atoms such as dimethyl itaconate and di-n-butyl itaconate; an itaconic acid dicycloalkyl ester having cycloalkyl groups having 4 to 16 carbon atoms such as dicyclohexyl itaconate; etc. may be mentioned.

As the $\alpha,\beta$-ethylenically unsaturated monocarboxylic acid monomer, acrylic acid, methacrylic acid, crotonic acid, etc. may be mentioned.

As the $\alpha,\beta$-ethylenically unsaturated polyvalent carboxylic acid monomer, itaconic acid, fumaric acid, maleic acid, etc. may be mentioned.

As the $\alpha,\beta$-ethylenically unsaturated polyvalent carboxylic acid anhydride monomer, maleic anhydride etc. may be mentioned.

As the conjugated diene monomer, 1,4-pentadiene, 1,4-hexadiene, etc. may be mentioned.

As the $\alpha$-olefin monomer, ethylene, propylene, 1-butene, 4-methyl-1-pentene, 1-hexene, and 1-octene, etc. may be mentioned.

As the aromatic vinyl monomer, styrene, $\alpha$-methylstyrene, vinylpyridine, etc. may be mentioned.

As the fluorine-containing vinyl monomer, fluoroethyl vinyl ether, fluoropropyl vinyl ether, o-trifluoromethylstyrene, vinyl pentafluorobenzoate, difluoroethylene, tetrafluoroethylene, etc. may be mentioned.

As the copolymerizable antiaging agent, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

These copolymerizable other monomers may also be used as plurality of types combined. The content of the copolymerizable other monomer unit(s) in the nitrile group-containing highly saturated copolymer rubber of the present invention is preferably 50 wt % or less, more preferably 40 wt % or less, and still more preferably 10 wt % or less, in all the monomer units.

The nitrile group-containing highly saturated copolymer rubber of the present invention has an iodine value of 35 to 85, preferably 40 to 70, and more preferably 40 to 60. In the present invention, the nitrile group-containing highly saturated copolymer rubber contains the above-mentioned respective monomers in the above-mentioned specific contents and has an iodine value within a specific range as above, and it is thus possible to make the obtained crosslinked rubber improved in cold resistance, while making the obtained cross-linked rubber excellent in heat resistance and compression set resistance. In particular, concerning cold resistance, the present invention can make the obtained cross-linked rubber sufficiently low in TR10 and, in addition, small in the difference between TR10 and TR70 (TR70-TR10). Note that TR10 is the temperature at which the length of a test piece is contracted (recovered) by 10% due to the temperature increase after the cross-linked rubber is frozen (the temperature at which a low-temperature elasticity recovery of 10% is exhibited), and due to sufficiently low TR10, it is possible to make the cross-linked rubber unlikely to break even when receiving an impact in low-temperature environments (excellent in low-temperature embrittlement resistance). TR70 is the temperature at which the length of a test piece is contracted (recovered) by 70% due to the temperature increase after the cross-linked rubber is frozen (the temperature at which a low-temperature elasticity recovery of 70% is exhibited), and the difference between TR10 and TR70 (TR70-TR10) is preferably 21° C. or less, more preferably 19° C. or less, and still more preferably 18° C. or less. Due to the difference between TR10 and TR70 (TR70-TR10) being small, good sealing properties in low-temperature environments can be obtained.

The nitrile group-containing highly saturated copolymer rubber of the present invention is capable of giving a cross-linked rubber, TR10 of which is sufficiently low and, moreover, the difference between TR10 and TR70 (TR70-TR10) of which is small. The cross-linked rubber is unlikely to break even when receiving an impact in low-temperature environments (excellent in low-temperature embrittlement resistance) and, moreover, exhibits good sealing properties also in low-temperature environments, and therefore can be particularly suitably used in seal member applications for use in low-temperature environments.

Note that when the iodine value is too small, the nitrile group-containing highly saturated copolymer rubber is likely to crystallize in low-temperature environments and results in increased TR70, consequently the difference between TR10 and TR70 (TR70-TR10) is increased, and the obtained cross-linked rubber is inferior in sealing properties in low-temperature environments. On the other hand, when the iodine value is too large, the proportion of the conjugated diene monomer unit (c) that is not saturated is increased, therefore TR70 is increased due to the influence of the double-bond moiety of the conjugated diene monomer unit (c) that is not saturated, consequently the difference between TR10 and TR70 (TR70-TR10) is increased, and the obtained cross-linked rubber is inferior in sealing properties in low-temperature environments.

The polymer Mooney viscosity ($ML_{1+4}$, 100° C.) of the nitrile group-containing highly saturated copolymer rubber of the present invention is preferably 10 to 200, more preferably 15 to 150, still more preferably 15 to 100, and particularly preferably 30 to 70. By setting the polymer Mooney viscosity within the above range, a good processability can be attained in the case where a cross-linkable rubber composition is prepared, without impairing the mechanical properties of the obtained cross-linked rubber.

As for a method for setting the iodine value of the nitrile group-containing highly saturated copolymer rubber of the present invention within the above range, for example, the iodine value can be controlled by suitably adjusting the type of hydrogenation catalyst, the amount of hydrogenation catalyst, the reaction temperature, the hydrogen pressure, the reaction time, etc. in a hydrogenation reaction when producing the nitrile group-containing highly saturated copolymer rubber. For example, a larger amount of hydrogenation catalyst tends to result in a lower iodine value and, likewise, a higher reaction temperature, a higher hydrogen pressure, and a longer reaction time tend to result in a lower iodine value as well. Accordingly, in the present invention, the iodine value can be controlled by suitably adjusting these conditions.

The method of production of the nitrile group-containing highly saturated copolymer rubber of the present invention is not particularly limited, but it is preferable to produce it by emulsion polymerization using an emulsifier to copolymerize the above monomers and prepare a latex of a nitrile group-containing copolymer rubber and hydrogenating it. At the time of emulsion polymerization, a normally used polymerization auxiliary material such as an emulsifier, polymerization initiator, and molecular weight adjuster may be used.

The emulsifier is not particularly limited, but, for example, a nonionic emulsifier such as polyoxyethylene alkyl ether, polyoxyethylene alkyl phenol ether, polyoxyethylene alkyl ester, and polyoxyethylene sorbitan alkyl ester; an anionic emulsifier such as a salt of a fatty acid such as myristic acid, palmitic acid, oleic acid, and linoleic acid, an alkylbenzene sulfonic acid salt such as sodium dodecylbenzene sulfonate, a higher alcohol sulfuric acid ester salt, and an alkyl sulfosuccinic acid salt; a copolymerizable emulsifier such as a sulfo ester of α,β-unsaturated carboxylic acid, a sulfate ester of α,β-unsaturated carboxylic acid, and a sulfoalkylaryl ether; etc. may be mentioned. The amount of use of the emulsifier is preferably 0.1 to 10 parts by weight with respect to 100 parts by weight of the total monomer.

The polymerization initiator is not particularly limited so long as a radical initiator, but an inorganic peroxide such as potassium persulfate, sodium persulfate, ammonium persulfate, potassium peiphosphate, and hydrogen peroxide; an organic peroxide such as t-butyl peroxide, cumen hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butyl peroxyisobutyrate; an azo compound such as azobisisobutyronitrile, azobis-2,4-dimethylvaleronitrile, azobiscyclohexane carbonitrile, and methyl azobisisobutyrate; etc. may be mentioned. The polymerization initiator may be used alone or as two types or more combined. As the polymerization initiator, an inorganic or organic peroxide is preferable. When using a peroxide as the polymerization initiator, it may be combined with a reducing agent such as sodium bisulfite and ferrous sulfate as a redox type polymerization initiator. The amount of use of the polymerization initiator is preferably 0.01 to 2 parts by weight with respect to 100 parts by weight of the total monomer.

The molecular weight adjuster is not particularly limited, but mercaptans such as t-dodecyl mercaptan, n-dodecyl mercaptan, and octyl mercaptan; a halogenated hydrocarbon such as carbon tetrachloride, methylene chloride, and methylene bromide; α-methylstyrene dimer; a sulfur-containing compound such as tetraethylthiuram disulfide, dipentamethylene thiuram disulfide, and diisopropyl xanthogen disulfide etc. may be mentioned. These may be used alone or as two types or more combined. Among these, mercaptans are preferable, while t-dodecyl mercaptan is more preferable. The amount of use of the molecular weight adjuster is preferably 0.1 to 0.8 part by weight with respect to 100 parts by weight of the total monomer.

For the medium of the emulsion polymerization, usually water is used. The amount of water is preferably 80 to 500 parts by weight with respect to 100 parts by weight of the total monomer.

At the time of emulsion polymerization, furthermore, in accordance with need, a polymerization auxiliary material such as a stabilizer, dispersant, pH adjuster, deoxidizer, and particle size adjuster may be used. When using these, the types and amounts are not particularly limited.

Further, the nitrile group-containing highly saturated copolymer rubber of the present invention can be produced by selectively hydrogenating double bonds of the conjugated diene monomer units (a3) of the nitrile group-containing copolymer rubber in the obtained latex of the nitrile group-containing copolymer rubber.

The hydrogenation may be performed on the basis of a heretofore known method. An oil layer hydrogenation method in which the latex of the copolymer obtained by emulsion polymerization is coagulated, and then the hydrogenation is performed in the oil layer; and an aqueous layer hydrogenation method in which the latex of the obtained copolymer is hydrogenated as it is, etc. may be mentioned. Of these methods, the oil layer hydrogenation method is preferable.

When the hydrogenation is performed by the oil layer hydrogenation method, preferably the latex of the nitrile group-containing copolymer rubber prepared by the emulsion polymerization is coagulated by salting out, and the coagulated product is filtered out and dried, and then, dissolved in an organic solvent. Next, a hydrogenation reaction (the oil layer hydrogenation method) is performed, the obtained hydride is poured into a large amount of water to be coagulated, the coagulated product is filtered out and dried, and thus the nitrile group-containing highly saturated copolymer rubber of the present invention can be obtained.

For the coagulation of the latex by salting out, a heretofore known coagulant such as sodium chloride, calcium chloride, or aluminum sulfate can be used. The solvent for the oil layer hydrogenation method is not particularly limited so long as the solvent is a liquid organic compound dissolving the nitrile group-containing copolymer rubber obtained by emulsion polymerization; however, as such a solvent, preferably used are benzene, chlorobenzene, toluene, xylene, hexane, cyclohexane, tetrahydrofuran, methyl ethyl ketone, ethyl acetate, cyclohexanone and acetone.

As the catalyst of the oil layer hydrogenation method, any heretofore known selective hydrogenation catalyst can be used without particular limitation; a palladium-based catalyst and a rhodium-based catalyst are preferable, and a palladium-based catalyst (such as palladium acetate, palladium chloride and palladium hydroxide) are more preferable. These may be used as two or more types combined; however, in such a case, it is preferable to use a palladium-based catalyst as the main active component. These catalysts are usually used as carried on carriers. As the carrier, silica, silica-alumina, alumina, diatomaceous earth, activated carbon, etc. may be mentioned. The amount of use of the catalyst is preferably 10 to 5000 ppm by weight and more preferably 100 to 3000 ppm by weight in relation to the copolymer.

Alternatively, when the hydrogenation is performed by the aqueous layer hydrogenation method, the hydrogenation reaction is performed by adding water to and diluting, if necessary, the latex of the nitrile group-containing copolymer rubber prepared by the emulsion polymerization. The aqueous layer hydrogenation method includes an aqueous layer direct hydrogenation method in which the latex is hydrogenated by supplying hydrogen to the reaction system in the presence of a hydrogenation catalyst, and an indirect aqueous layer hydrogenation method in which the latex is hydrogenated by reducing the latex in the presence of an oxidizing agent, a reducing agent and an activating agent. Of these two methods, the aqueous layer direct hydrogenation method is preferable.

In the aqueous layer direct hydrogenation method, the concentration of the copolymer in the aqueous layer (concentration in latex state) is preferably 40 wt % or less, in order to prevent the aggregation. The hydrogenation catalyst is not particularly limited so long as the catalyst is a compound being hardly decomposed by water. As specific examples, among palladium catalysts, as palladium salts of carboxylic acids such as formic acid, propionic acid, lauric acid, succinic acid, oleic acid, and phthalic acid; palladium chlorides such as palladium chloride, dichloro(cyclooctadiene)palladium, dichloro(norbomadiene)palladium, and ammonium hexachloropalladate(IV); iodides such as palladium iodide; palladium(II) sulfate dihydrate, etc. may be mentioned. Among these, the palladium salts of carboxylic acids, dichloro(norbornadiene)palladium, and ammonium hexachloropalladate(IV) are particularly preferable. The amount of use of the hydrogenation catalyst may be appropriately set; however, the amount of use of the hydrogenation catalyst is preferably 5 to 6000 ppm by weight and more preferably 10 to 4000 ppm by weight in relation to the nitrile rubber (a).

In the aqueous layer direct hydrogenation method, after the completion of the hydrogenation reaction, the hydrogenation catalyst in the latex is removed. As the method for removing the hydrogenation catalyst, for example, it is possible to adopt a method in which an adsorbent such as activated carbon or an ion-exchange resin is added to the latex, the hydrogenation catalyst is adsorbed to the adsorbent under stirring, and then the latex is subjected to a filtration or centrifugation. It is also possible not to remove the hydrogenation catalyst so as remain in the latex.

Further, in the aqueous layer direct hydrogenation method, the thus obtained latex after the hydrogenation reaction is salted out to be coagulated, filtered and dried, and subjected to other operations, and thus, the nitrile group-containing highly saturated copolymer rubber of the present invention can be obtained. In this case, the steps of filtration and drying following the step of coagulation can be performed with heretofore known methods, respectively.

Cross-Linkable Rubber Composition

The cross-linkable rubber composition of the present invention comprises the nitrile group-containing highly saturated copolymer rubber and a cross-linking agent. The cross-linking agent used in the present invention is not particularly limited so long as the cross-linking agent can cross-link the nitrile group-containing highly saturated copolymer rubber of the present invention; and, for example, a sulfur-based cross-linking agent, an organic peroxide cross-linking agent, etc. may be mentioned. Among these, an organic peroxide cross-linking agent is preferable.

As the sulfur-based cross-linking agent, sulfur such as a powdery sulfur and precipitated sulfur; organic sulfur compounds such as 4,4'-dithiomorpholine, tetramethylthiuram disulfide, tetraethylthiuram disulfide, and polymeric polysulfide; etc. may be mentioned. The amount of use of the sulfur-based cross-linking agent is preferably 0.1 to 5 parts by weight, more preferably 0.2 to 4.5 parts by weight, and still more preferably 0.3 to 4 parts by weight, in relation to 100 parts by weight of the nitrile group-containing highly saturated copolymer rubber. When the sulfur-based cross-linking agent is used, by setting the amount of use thereof within the above range, it is possible to make the obtained cross-linked rubber sufficient in the cross-linking density, while making the obtained cross-linked rubber good in the compression set resistance and the bending fatigue resistance.

The organic peroxide cross-linking agent is not particularly limited so long as the organic peroxide cross-linking agent is a cross-linking agent used in the field of rubber industry; and, for example, dialkyl peroxides, diacyl peroxides, peroxy esters, etc. may be mentioned, and preferably dialkyl peroxides, etc. may be mentioned.

As the dialkyl peroxides, for example, dicumyl peroxide, di-t-butyl peroxide, 2,5-dimethyl-2,5-di(t-butylperoxy)-3-hexyne, 2,5-dimethyl-2,5-di(t-butylperoxy)hexane, 1,3-bis(t-butylperoxyisopropyl)benzene, etc. may be mentioned.

As the diacyl peroxides, for example, benzoyl peroxide, isobutyryl peroxide, etc. may be mentioned.

As peroxy esters, for example, 2,5-dimethyl-2,5-bis(benzoylperoxy)hexane, t-butylperoxyisopropylcarbonate, etc. may be mentioned.

The amount of use of the organic peroxide cross-linking agent is preferably 1 to 16 parts by weight, more preferably 1 to 14 parts by weight, and still more preferably 1 to 12 parts by weight, in relation to 100 parts by weight of the nitrile group-containing highly saturated copolymer rubber. When the organic peroxide cross-linking agent is used, by setting the amount of use thereof within the above range, it is possible to make the obtained cross-linked rubber sufficient in the cross-linking density, while making the obtained cross-linked rubber good in the compression set resistance and the rubber elasticity.

When the sulfur-based cross-linking agent is used as a cross-linking agent, it is preferable to use zinc flower or stearic acid as a cross-linking aid, and a guanidine-based cross-linking accelerator, a thiazol-based cross-linking accelerator, a thiuram-based cross-linking accelerator, a dithiocarbamate-based cross-linking accelerator, etc. as a cross-linking accelerator, in combination.

When the organic peroxide cross-linking agent is used as a cross-linking agent, triaryl cyanurate, trimethylolpropane trimethacrylate, N,N'-m-phenylene bismaleimide, etc. may be used as a cross-linking aid in combination.

The cross-linking aids may be used as single types alone or as a plurality of types combined, and may be used after being dispersed in clay, calcium carbonate, silica, or the like to improve processability for the cross-linkable rubber composition. The amount of use of the cross-linking aid is not particularly limited, and may be determined according to the application of the cross-linked product, the required performance, the type of the cross-linking agent, the type of the cross-linking aid, etc.

The cross-linkable rubber composition of the present invention preferably contains a plasticizer for making the effects of the present invention more remarkable.

The plasticizer is not particularly limited, and, for example, adipic acid ether ester-based plasticizers such as dibutoxyethyl adipate, di(butoxyethoxyethyl) adipate, di(methoxytetraethylene glycol) adipate, di(methoxypentaethylene glycol) adipate, and (methoxytetraethylene glycol) (methoxypentaethylene glycol) adipate; azelaic acid ether ester-based plasticizers such as dibutoxyethyl azelate and di(butoxyethoxyethyl) azelate; sebacic acid ether ester-based plasticizers such as dibutoxyethyl sebacate and di(butoxyethoxyethyl) sebacate; phthalic acid ether ester-based plasticizers such as dibutoxyethyl phthalate and di(butoxyethoxyethyl) phthalate; isophthalic acid ether ester-based plasticizers such as dibutoxyethyl isophthalate and di(butoxyethoxyethyl) isophthalate; adipic acid dialkyl ester-based plasticizers such as di(2-ethylhexyl) adipate, diisodecyl adipate, diisononyl adipate, and dibutyl adipate; azelaic acid dialkyl ester-based plasticizers such as di(2-ethylhexyl) azelate, diisooctyl azelate, and di-n-hexyl azelate; sebacic acid dialkyl ester-based plasticizers such as di-n-butyl sebacate and di(2-ethylhexyl) sebacate; phthalic acid dialkyl ester-based plasticizers such as dibutyl phthalate, di(2-ethylhexyl) phthalate, di-n-octyl phthalate, diisobutyl phthalate, diheptyl phthalate, diisodecyl phthalate, diundecyl phthalate, and diisononyl phthalate; phthalic acid dicycloalkyl ester-based plasticizers such as dicyclohexyl phthalate; phthalic acid aryl ester-based plasticizers such as diphenyl phthalate and butyl benzyl phthalate; isophthalic acid dialkyl ester-based plasticizers such as di(2-ethylhexyl) isophthalate and diisooctyl isophthalate; tetrahydrophthalic acid dialkyl ester-based plasticizers such as di(2-ethylhexyl) tetrahydrophthalate, di-n-octyl tetrahydrophthalate, and diisodecyl tetrahydrophthalate; trimellitic acid derivatives such as tri(2-ethylhexyl) trimellitate, tri-n-octyl trimellitate, triisodecyl trimellitate, triisooctyl trimellitate, tri-n-hexyl trimellitate, triisononyl trimellitate, and triisodecyl trimellitate; epoxy-based plasticizers such as epoxidized soybean oil and epoxidized linseed oil; phosphoric acid ester-based plasticizers such as tricresyl phosphate; polyether ester-based plasticizers such as trade name "Adekacizer RS-700" (made by ADEKA Corporation) and trade name "Adekacizer RS-735" (made by ADEKA Corporation); etc. may be mentioned. These can be used as single types alone or as a plurality of types combined.

Among these plasticizers, from the viewpoint of being capable of providing a greater effect of adding a plasticizer, adipic acid ether ester-based plasticizers and polyether ester-based plasticizers are preferable.

The amount of the plasticizer in the cross-linkable rubber composition of the present invention is preferably 3 to 30 parts by weight, more preferably 4 to 25 parts by weight, and still more preferably 5 to 20 parts by weight, in relation to 100 parts by weight of the nitrile group-containing highly saturated copolymer rubber.

Further, the cross-linkable rubber composition of the present invention may contain, in addition to the above components, compounding agents usually used in the field of rubber such as a reinforcing agent such as carbon black or silica, a filler such as calcium carbonate, talc or clay, a metal oxide such as zinc oxide or magnesium oxide, an $\alpha,\beta$-ethylenically unsaturated carboxylic acid metal salt such as zinc methacrylate or zinc acrylate, a co-cross-linking agent, a cross-linking retarder, an antiaging agent, an antioxidant, a light stabilizer, a scorch retarder such as a primary amine, an activating agent such as diethylene glycol, a silane coupling agent, a plasticizer, a processing aid, a slip agent, an adhesive, a lubricant, a flame retardant, an antifungal agent, an acid acceptor, an antistatic agent, a pigment, and a foaming agent. The amounts of these compounding agents are not particularly limited and the compounding agents can be compounded in the amounts according to the compounding purposes so long as the compounding amounts are within ranges not impairing the object and the effects of the present invention.

Among them, it is preferable to contain at least a reinforcing agent such as carbon black or silica from the viewpoint of improving strength, and the amount of the reinforcing agent is preferably 5 to 300 parts by weight, more preferably 10 to 200 parts by weight, and still more preferably 20 to 100 parts by weight, in relation to 100 parts by weight of the nitrile group-containing highly saturated copolymer rubber. When the amount of the reinforcing agent is within this range, the strength of the obtained crosslinked rubber can be suitably increased without deteriorating processability and the like.

As carbon black, furnace black, acetylene black, thermal black, channel black, austin black, graphite, etc. may be mentioned. These may be used as single types or a plurality of types combined.

As silica, natural silica such as quartz powder and silica stone powder; synthetic silica such as silicic anhydride (such as silica gel and aerosil) and hydrous silicic acid; etc. may be mentioned, and among these, synthetic silica is preferable. Further, these silicas may be surface treated with a silane coupling agent or the like.

The silane coupling agent is not particularly limited, but as specific examples thereof, sulfur-containing silane coupling agents such as γ-mercaptopropyltrimethoxysilane, γ-mercaptomethyltrimethoxysilane, γ-mercaptomethyltriethoxysilane, γ-mercaptohexamethyldisilazane, bis(3-triethoxysilylpropyl)tetrasulfane, and bis(3-triethoxysilylpropyl)disulfane; epoxy group-containing silane coupling agents such as γ-glycidoxypropyltrimethoxysilane, γ-glycidoxypropylmethyldimethoxysilane, β-(3,4-epoxycyclohexyl)ethyltrimethoxysilane, γ-mercaptopropyltrimethoxysilane, and γ-glycidoxypropylmethyldiethoxysilane; amino group-containing silane coupling agents such as N-(β-aminoethyl)-γ-aminopropyltrimethoxysilane, γ-aminopropyltrimethoxysilane, γ-aminopropyltriethoxysilane, (aminoethyl)-3-aminopropyltrimethoxysilane, N-2-(aminoethyl)-3-aminopropyltriethoxysilane, 3-triethoxysilyl-N-(1,3-dimethyl-butylidene)propylamine, and N-phenyl-3-aminopropyltrimethoxysilane; (meth)acryloxy group-containing silane coupling agents such as γ-methacryloxypropyltrimethoxysilane, methacryloxypropyltris(β-methoxyethoxy)silane, methacryloxypropylmethyldimethoxysilane, γ-methacryloxypropylmethyldiethoxysilane, γ-methacryloxypropyltriethoxysilane, and 3-acryloxypropyltrimethoxysilane; vinyl group-containing silane coupling agents such as vinyltrimethoxysilane, vinyltriethoxysilane, vinyltris(β-methoxyethoxy)silane, vinyltrichlorosilane, and vinyltriacetoxysilane; chloropropyl group-containing silane coupling agents such as 3-chloropropyltrimethoxysilane; isocyanate group-containing silane coupling agents such as 3-isocyanatopropyltriethoxysilane; styryl group-containing silane coupling agents such as p-styryltrimethoxysilane; ureido group-containing silane coupling agents such as 3-ureidopropyltriethoxysilane; allyl group-containing silane coupling agents such as diallyldimethylsilane; alkoxy group-containing silane coupling agents such as tetraethoxysilane; phenyl group-containing silane coupling agents such as diphenyldimethoxysilane; fluoro group-containing silane coupling agents such as trifluoropropyltrimethoxysilane; alkyl group-containing silane coupling agents such as isobutyltrimethoxysilane and cyclohexylmethyldimethoxysilane; aluminum-based coupling agents such as acetoalkoxyaluminum diisopropylate; titanate-based coupling agents such as isopropyltriisostearoyl titanate, isopropyltris(dioctylpyrophosphate) titanate, isopropyltri(N-aminoethyl-aminoethyl) titanate, tetraoctylbis(ditridecyl-phosphite) titanate, tetra(2,2-diallyloxymethyl-1-butyl)bis(ditridecyl)phosphite titanate, bis(dioctylpyrophosphate) oxyacetate titanate, bis(dioctylpyrophosphate)ethylene titanate, tetraisopropylbis(dioctylphosphite) titanate, and isopropyltriisostearoyl titanate; etc. may be mentioned. These may be used as single types or a plurality of types combined.

The co-cross-linking agent is not particularly limited, but is preferably a low molecular weight or high molecular weight compound having a plurality of radically reactive unsaturated groups in the molecule. For example, polyfunctional vinyl compounds such as divinylbenzene and divinylnaphthalene; isocyanurates such as trially isocyanurate and trimethallyl isocyanurate; cyanurates such as triallylcyanurate; maleimides such as N,N'-m-phenylenedimaleimide; allyl esters of polyvalent acids such as diallyl phthalate, diallyl isophthalate, diallyl maleate, diallyl fumarate, diallyl sebacate, and triallyl phosphate; diethylene glycol bisallyl carbonate; allyl ethers such as ethylene glycol diallyl ether, triallyl ether of trimethylol propane, and partial allyl ether of pentaerythrit; allyl-modified resins such as allylated novolac resin and allylated resol resin; and 3 to 5-functional methacrylate compounds and acrylate compounds such as trimethylolpropane trimethacrylate and trimethylolpropane triacrylate; etc. may be mentioned. These may be used as single types or a plurality of types combined.

Furthermore, the cross-linkable rubber composition of the present invention may contain rubber other than the above-mentioned nitrile group-containing highly saturated copolymer rubber in a range where the effects of the present invention are not obstructed. As rubber other than the nitrile group-containing highly saturated copolymer rubber, acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylene rubber, natural rubber, polyisoprene rubber, etc. may be mentioned. When the cross-linkable rubber composition of the present invention contains rubber other than the nitrile group-containing highly saturated copolymer rubber, the amount of the rubber is preferably 30 parts by weight or less, more preferably 20 parts by weight or less, and particularly preferably 10 parts by weight or less, in relation to 100 parts by weight of the nitrile group-containing highly saturated copolymer rubber.

The cross-linkable rubber composition of the present invention can be prepared by mixing the above-mentioned ingredients preferably in a nonaqueous system. The method for preparing the cross-linkable rubber composition of the present invention is not limited, but the cross-linkable rubber composition of the present invention can be usually prepared as follows: the ingredients other than the cross-linking agent and those unstable against heat such as the cross-linking aid are subjected to a primary kneading with a mixing machine such as a Banbury mixer, an internal mixer or a kneader; then the kneaded mixture is transferred to an open roll or the like, and the cross-linking agent and those unstable against heat such as the cross-linking aid are added to the kneaded mixture, and then the resulting mixture is subjected to a secondary kneading to prepare the cross-linkable rubber composition. Note that the primary kneading is usually performed at 10 to 200° C. and preferably at 30 to 180° C. for 1 minute to 1 hour and preferably 1 minute to 30 minutes, and the secondary kneading is usually performed at 10 to 90° C., and preferably at 20 to 60° C., for 1 minute to 1 hour and preferably 1 minute to 30 minutes.

Cross-Linked Rubber

The cross-linked rubber of the present invention is obtained by cross-linking the above cross-linkable rubber composition of the present invention.

The cross-linked rubber of the present invention can be produced as follows: the cross-linkable rubber composition of the present invention is used, the composition is famed by using a forming machine corresponding to the desired shape, such as an extruder, an injection molding machine, a compressor, or a roll, the cross-linking reaction is performed by heating the famed product, and thus the shape of the formed product is fixed to produce the cross-linked rubber. In this case, the cross-linking may be performed after preliminarily performing the forming, or alternatively, the forming and the cross-linking may also be performed simultaneously. The forming temperature is usually 10 to 200° C., and preferably 25 to 120° C. The cross-linking temperature is usually 100 to 200° C. and preferably 130 to 190° C., and the cross-linking time is usually 1 minute to 24 hours and preferably 2 minutes to 1 hour.

Further, depending on the shape, size, etc. of the cross-linked product, sometimes, even if the surface is cross-linked, the inside part is not sufficiently cross-linked, so it is possible to further heat the rubber for secondary cross-linking.

As the heating method, a general method which is used for cross-linking rubber such as press heating, steam heating, oven heating, and hot air heating may be suitably selected.

The thus obtained cross-linked rubber of the present invention is obtained by using the above nitrile group-containing highly saturated copolymer rubber of the present invention, and is excellent in heat resistance, compression set resistance, and cold resistance. In particular, concerning cold resistance, TR10 is sufficiently low and, in addition, the difference between TR10 and TR70 (TR70-TR10) is small.

Therefore, the cross-linked rubber of the present invention, taking advantage of such a characteristic, can be used for various seal members such as O-rings, packings, diaphragms, oil seals, shaft seals, bearing seals, well head seals, shock absorber seals, air compressor seals, seals for sealing in Freon or fluorohydrocarbons or carbon dioxide which is used for compressors for cooling devices for air-conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventer), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator gaskets which are attached between pairs of housings straddling unit cells provided with positive electrodes, electrolyte plates, and negative electrodes, and top cover gaskets for hard disk drives; various types of rolls such as printing rolls, ironmaking rolls, papermaking rolls, industrial rolls, and office equipment rolls; various types of belts such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuit boards or other binders, fuel cell separators and also other broad applications in the electronics field.

In particular, concerning cold resistance, the cross-linked rubber of the present invention has sufficiently low TR10 and, in addition, the difference between TR10 and TR70 (TR70-TR10) is small, preferably 21° C. or less, more preferably 19° C. or less, and still more preferably 18° C. or less. Therefore the cross-linked rubber of the present invention can be suitably used in materials for use in low-temperature environments. Specifically, the cross-linked rubber of the present invention can be suitably used as a seal member, a belt, a hose, or a gasket for use in low-temperature environments, and can be particularly suitably used in seal member applications such as a shock absorber seal for use in low-temperature environments.

EXAMPLES

Hereinafter, the present invention will be described in more detail by way of Examples and Comparative Examples, but the present invention is not limited to the Examples. In what follows, unless otherwise specified, "parts" are based on weight. The test or evaluation methods of physical properties and characteristics are as follows.

Composition of Nitrile Group-Containing Highly Saturated Copolymer Rubber

The contents of the respective monomer units constituting the nitrile group-containing highly saturated copolymer rubber were measured by the following method.

That is to say, the content of the acrylonitrile unit was calculated by measuring the nitrogen content in the nitrile group-containing highly saturated copolymer rubber by the Kjeldahl method in accordance with JIS K6383.

The content of the 1,3-butadiene unit and the saturated butadiene unit was calculated by measuring the iodine value (in accordance with JIS K6235) before the hydrogenation reaction and after the hydrogenation reaction using the nitrile group-containing copolymer rubber.

The content of the n-butyl acrylate unit and the methoxyethyl acrylate unit was calculated as that of components excluding the above respective monomer units.

Iodine Value

The iodine value of the nitrile group-containing highly saturated copolymer rubber was measured in accordance with JIS K6235.

Original state physical properties (Tensile Strength, Elongation)

The cross-linkable rubber composition was placed in a mold of 15 cm in length, 15 cm in width and 0.2 cm in depth, and was press-foamed at 170° C. for 20 minutes while being pressurized, and thus a sheet-shaped cross-linked product was obtained. The product was transferred to a Geer oven and subjected to a secondary cross-linking at 170° C. for 4 hours, and the obtained sheet-shaped cross-linked product was stamped with a #3 dumbbell to prepare a test piece. By using this test piece, the tensile strength and the elongation of the cross-linked rubber were measured in accordance with JIS K6251.

Heat Aging Resistance

A sheet-shaped cross-linked rubber as used in the evaluation of original state physical properties was obtained, and then stamped with a JIS #3 dumbbell to prepare a test piece. A hot air aging treatment was performed by retaining the obtained test piece in a Geer oven at 135° C. for 168 hours as prescribed in Item 4 "Hot Air Aging Test (Normal Oven Method)" of JIS K6257 "Aging Test Methods for Vulcanized Rubber". The elongation of the test piece subjected to the hot air aging treatment (the heat-aged test piece) was measured in accordance with JIS K6251. The elongation change was determined from the obtained measurement results based on the following expression. The smaller the absolute value of elongation change can be evaluated as better heat aging resistance.

Elongation change (%)={((Elongation after heat aging)−(Elongation in normal state))/(Elongation in normal state)}×100

Cold Resistance (TR10, TR70)

A sheet-shaped cross-linked product obtained in the same manner as in the evaluation of original state physical properties was used to measure the cold resistance of the cross-linked rubber in accordance with JIS K6261 by the TR test (low temperature elasticity recovery test). Specifically, an extended test piece was frozen, then the recoverability of the extended test piece was measured by continuously increasing the temperature, and the temperature TR10 at which the length of the test piece was contracted (recovered) by 10% due to the temperature increase and the temperature TR70 at which the length of the test piece was contracted (recovered) by 70% due to the temperature increase were measured. The lower TR10, and the smaller the difference between TR10 and TR70 (TR70-TR10) can be evaluated as better cold resistance of the test piece.

Compression Set

The cross-linkable rubber composition was subjected to a primary cross-linking by being pressed using a mold at 170° C. for 20 minutes while being pressurized, and the obtained cross-linked product was transferred to a Geer oven and subjected to a secondary cross-linking at 170° C. for 4 hours to obtain a columnar cross-linked rubber of 29 mm in diameter and 12.5 mm in height. Further, in accordance with JIS K6262, the obtained cross-linked rubber was left to stand in a 135° C. environment for 168 hours while being compressed by 25%, and then the compression set of the cross-linked rubber was measured. The smaller the value is, the more excellent the compression set resistance is.

Synthesis Example 1 (Production of Nitrile Group-Containing Highly Saturated Copolymer Rubber (A1))

In a reactor, 200 parts of ion exchanged water and 0.2 part of sodium carbonate were placed. After the sodium carbonate was dissolved, 2.25 parts of fatty acid potassium soap (potassium salt of fatty acid) was added thereto to prepare an aqueous soap solution. Then, 9 parts of acrylonitrile, 39 parts of n-butyl acrylate, and 0.5 part of t-dodecyl mercaptan (molecular weight adjuster) were added to the obtained aqueous soap solution in this order, the gas inside the reactor was replaced with nitrogen three times, and then 32 parts of 1,3-butadiene was placed in the reactor. Then, the interior of the reactor was held at 5° C., and 0.1 part of cumene hydroperoxide (polymerization initiator) and suitable amounts of a reducing agent and a chelating agent were placed in the reactor to initiate a polymerization reaction; at the time when the polymerization conversion rate reached 60%, 10 parts of acrylonitrile and 10 parts of 1,3-butadiene were added, and at the time when the polymerization conversion rate reached 85%, 0.1 part of an aqueous solution of hydroquinone (polymerization terminator) having a concentration of 10% was added to terminate the polymerization reaction. Next, the residual monomers were removed by using a rotary evaporator at a water temperature of 60° C. to obtain a latex (solid content concentration: approximately 25 wt %) of a copolymer rubber.

The latex obtained above was added to an aqueous solution of aluminum sulfate in an amount of 3 wt % in relation to the copolymer rubber content thereof and stirred to coagulate the latex. The latex was filtered out while being washed with water and then vacuum dried at 60° C. for 12 hours to thereby obtain a copolymer rubber.

The obtained copolymer rubber was dissolved in acetone so as to have a concentration of 12%, the mixture was placed in an autoclave, a palladium-silica catalyst in an amount of 400 ppm by weight in relation to the copolymer rubber was added, and a hydrogenation reaction was performed at a hydrogen pressure of 3.0 MPa. After the hydrogenation reaction, the obtained hydride was poured into a large amount of water to be coagulated, the coagulated product was filtered out and dried, and thus a nitrile group-containing highly saturated copolymer rubber (A1) was obtained. The composition of the obtained nitrile group-containing highly saturated copolymer rubber (A1) was 19 wt % of the acrylonitrile unit, 34 wt % of the n-butyl acrylate unit, and 47 wt % of the 1,3-butadiene unit (including the saturated fraction), and the iodine value was 50.

Synthesis Example 2 (Production of Nitrile Group-Containing Highly Saturated Copolymer Rubber (A2))

The nitrile group-containing copolymer rubber (A2) was obtained in the same manner as in Synthesis Example 1 except that when performing the hydrogenation reaction, the amount of use of the palladium-silica catalyst was 450 ppm by weight, and the hydrogen pressure was 3.0 MPa. The composition of the obtained nitrile group-containing highly saturated copolymer rubber (A2) was 19 wt % of the acrylonitrile unit, 34 wt % of the n-butyl acrylate unit, and 47 wt % of the 1,3-butadiene unit (including the saturated fraction), and the iodine value was 40.

Synthesis Example 3 (Production of Nitrile Group-Containing Highly Saturated Copolymer Rubber (A3))

The nitrile group-containing highly saturated copolymer rubber (A3) was obtained in the same manner as in Synthesis Example 1 except that when performing the hydrogenation reaction, the amount of use of the palladium-silica catalyst was 350 ppm by weight, and the hydrogen pressure was 3.0 MPa. The composition of the obtained nitrile group-containing highly saturated copolymer rubber (A3) was 19 wt % of the acrylonitrile unit, 34 wt % of the n-butyl acrylate unit, and 47 wt % of the 1,3-butadiene unit (including the saturated fraction), and the iodine value was 60.

Synthesis Example 4 (Production of Nitrile Group-Containing Highly Saturated Copolymer Rubber (A4))

The nitrile group-containing highly saturated copolymer rubber (A4) was obtained in the same manner as in Synthesis Example 1 except that when performing the hydrogenation reaction, the amount of use of the palladium-silica catalyst was 300 ppm by weight, and the hydrogen pressure was 3.0 MPa. The composition of the obtained nitrile group-containing highly saturated copolymer rubber (A4) was 19 wt % of the acrylonitrile unit, 34 wt % of the n-butyl acrylate unit, and 47 wt % of the 1,3-butadiene unit (including the saturated fraction), and the iodine value was 80.

Synthesis Example 5 (Production of Nitrile Group-Containing Highly Saturated Copolymer Rubber (A5))

The copolymer rubber latex was obtained in the same manner as in Synthesis Example 1 except that the amount of addition of acrylonitrile, the amount of addition of n-butyl acrylate, and the amount of addition of 1,3-butadiene when initiating polymerization were changed to 6 parts, 50 parts, and 28 parts, respectively, and the amount of addition of acrylonitrile when the polymerization conversion rate reached 60% was changed to 6 parts, and then the hydrogenation reaction was performed in the same manner as in Synthesis Example 1 to obtain the nitrile group-containing highly saturated copolymer rubber (A.5). The composition of the obtained nitrile group-containing highly saturated copolymer rubber (A5) was 12 wt % of the acrylonitrile unit, 45 wt % of the n-butyl acrylate unit, and 43 wt % of the 1,3-butadiene unit (including the saturated fraction), and the iodine value was 50.

Synthesis Example 6 (Production of Nitrile Group-Containing Highly Saturated Copolymer Rubber (A6))

The copolymer rubber latex was obtained in the same manner as in Synthesis Example 1 except that the amount of addition of acrylonitrile, the amount of addition of n-butyl acrylate, and the amount of addition of 1,3-butadiene when initiating polymerization were changed to 26 parts, 13 parts, and 41 parts, respectively, and then the hydrogenation reaction was performed in the same manner as in Synthesis Example 1 to obtain the nitrile group-containing highly saturated copolymer rubber (A6). The composition of the obtained nitrile group-containing highly saturated copolymer rubber (A6) was 36 wt % of the acrylonitrile unit, 10 wt % of the n-butyl acrylate unit, and 54 wt % of the 1,3-butadiene unit (including the saturated fraction), and the iodine value was 50.

Synthesis Example 7 (Production of Nitrile Group-Containing Highly Saturated Copolymer Rubber (A7))

The copolymer rubber latex was obtained in the same manner as in Synthesis Example 1 except that 39 parts of methoxyethyl acrylate was used in place of 39 parts of n-butyl acrylate, and then the hydrogenation reaction was performed in the same manner as in Synthesis Example 1 to obtain the nitrile group-containing highly saturated copolymer rubber (A7). The composition of the obtained nitrile group-containing highly saturated copolymer rubber (A7) was 19 wt % of the acrylonitrile unit, 34 wt % of the methoxyethyl acrylate unit, and 47 wt % of the 1,3-butadiene unit (including the saturated fraction), and the iodine value was 50.

Synthesis Example 8 (Production of Nitrile Group-Containing Highly Saturated Copolymer Rubber (A8))

The nitrile group-containing highly saturated copolymer rubber (A8) was obtained in the same manner as in Synthesis Example 1 except that when performing the hydrogenation reaction, the amount of use of the palladium-silica catalyst was 600 ppm by weight, and the hydrogen pressure was 3.0 MPa. The composition of the obtained nitrile group-containing highly saturated copolymer rubber (A8) was 19 wt % of the acrylonitrile unit, 34 wt % of the n-butyl acrylate unit, and 47 wt % of the 1,3-butadiene unit (including the saturated fraction), and the iodine value was 20.

Synthesis Example 9 (Production of Nitrile Group-Containing Highly Saturated Copolymer Rubber (A9))

The nitrile group-containing highly saturated copolymer rubber (A9) was obtained in the same manner as in Synthesis Example 1 except that when performing the hydrogenation reaction, the amount of use of the palladium-silica catalyst was 250 ppm by weight, and the hydrogen pressure was 3.0 MPa. The composition of the obtained nitrile group-containing highly saturated copolymer rubber (A9) was 19 wt % of the acrylonitrile unit, 34 wt % of the n-butyl acrylate unit, and 47 wt % of the 1,3-butadiene unit (including the saturated fraction), and the iodine value was 90.

Synthesis Example 10 (Production of Nitrile Group-Containing Highly Saturated Copolymer Rubber (A10))

The copolymer rubber latex was obtained in the same manner as in Synthesis Example 1 except that the amount of addition of acrylonitrile, the amount of addition of n-butyl acrylate, and the amount of addition of 1,3-butadiene when initiating polymerization were changed to 4 parts, 29 parts, and 53 parts, respectively, and the amount of addition of acrylonitrile when the polymerization conversion rate reached 60% was changed to 4 parts, and then the hydrogenation reaction was performed in the same manner as in Synthesis Example 1 to obtain the nitrile group-containing highly saturated copolymer rubber (A10). The composition of the obtained nitrile group-containing highly saturated copolymer rubber (A.10) was 8 wt % of the acrylonitrile unit, 27 wt % of the n-butyl acrylate unit, and 65 wt % of the 1,3-butadiene unit (including the saturated fraction), and the iodine value was 50.

Synthesis Example 11 (Production of Nitrile Group-Containing Highly Saturated Copolymer Rubber (A11))

The copolymer rubber latex was obtained in the same manner as in Synthesis Example 1 except that the amount of addition of acrylonitrile, the amount of addition of n-butyl acrylate, and the amount of addition of 1,3-butadiene when initiating polymerization were changed to 35 parts, 46 parts, and 5 parts, respectively, and the amount of addition of acrylonitrile and the amount of addition of 1,3-butadiene when the polymerization conversion rate reached 60% were changed to 10 parts and 4 parts, respectively, and then the hydrogenation reaction was performed in the same manner as in Synthesis Example 1 to obtain the nitrile group-containing highly saturated copolymer rubber (A11). The composition of the obtained nitrile group-containing highly saturated copolymer rubber (A11) was 45 wt % of the acrylonitrile unit, 43 wt % of the n-butyl acrylate unit, and 12 wt % of the 1,3-butadiene unit (including the saturated fraction), and the iodine value was 50.

Example 1

Using a Banbury mixer, the following ingredients were added to and kneaded with 100 parts of the nitrile group-containing highly saturated copolymer rubber (A1) obtained in Synthesis Example 1: 50 parts of an EEF carbon (trade name "Seast SO," made by Tokai Carbon Co., Ltd., carbon black), 5 parts of an adipic acid ether ester-based plasticizer (trade name "Adekacizer RS-107," made by ADEKA Corporation, di(butoxyethoxyethyl) adipate), 1.5 parts of 4,4'-di-(α,α-dimethylbenzyl)diphenylamine (trade name "Nbcrac CD," made by Ouchi Shinko Chemical Industrial Co., Ltd., antiaging agent), 1.5 parts of zinc salt of 2-mercaptobenzimidazole (trade name "Nbcrac MBZ," made by Ouchi Shinko Chemical Industrial Co., Ltd., antiaging agent), 1 part of stearic acid, 5 parts of zinc oxide (zinc flower I, made by Seido Chemical Industry Co., Ltd.), and 6 parts of 1,3-bis(t-butylperoxyisopropyl)benzene (40% product) (trade name "VulCup® 40KE," made by Arkema Inc., organic peroxide cross-linking agent), and thus a cross-linkable rubber composition was obtained.

By using the above-mentioned methods and by using the obtained cross-linkable rubber composition, original state physical properties (tensile strength, elongation), heat aging resistance, cold resistance (TR10, TR70), and compression set were measured. The results thus obtained are shown in Table 1.

Examples 2 to 7

Cross-linkable rubber compositions were obtained in the same manner as in Example 1 except that the nitrile group-containing highly saturated copolymer rubbers (A2) to (A7) obtained in Synthesis Examples 2 to 7 were used in place of the nitrile group-containing highly saturated copolymer rubber (A1) obtained in Synthesis Example 1, and the obtained cross-linkable rubber compositions were evaluated in the same manner as in Example 1. The results thus obtained are shown in Table 1.

Example 8

A cross-linkable rubber composition was obtained in the same manner as in Example 1 except that a polyether ester-based plasticizer (trade name "Adekacizer RS-700," made by ADEKA Corporation, molecular weight: approximately 550) was used in place of the adipic acid ether ester-based plasticizer (trade name "Adekacizer RS-107," made by ADEKA Corporation, di(butoxyethoxyethyl) adipate), and the obtained cross-linkable rubber compositions were evaluated in the same manner as in Example 1. The results thus obtained are shown in Table 1.

Examples 9

A cross-linkable rubber composition was obtained in the same manner as in Example 1 except that a polyether ester-based plasticizer (trade name "Adekacizer RS-735," made by ADEKA Corporation, molecular weight: approximately 850) was used in place of the adipic acid ether ester-based plasticizer (trade name "Adekacizer RS-107," made by ADEKA Corporation, di(butoxyethoxyethyl) adipate), and the obtained cross-linkable rubber compositions were evaluated in the same manner as in Example 1. The results thus obtained are shown in Table 1.

Example 10

A cross-linkable rubber composition was obtained in the same manner as in Example 1 except that the amount of the EEF carbon (trade name "Seast SO," made by Tokai Carbon Co., Ltd., carbon black) was changed to 80 parts, and the obtained cross-linkable rubber composition was evaluated in the same manner as in Example 1. The results thus obtained are shown in Table 1.

Example 11

A cross-linkable rubber composition was obtained in the same manner as in Example 1 except that 50 parts of silica (trade name "Carplex® #1120," made by Evonik Industries) was used in place of 50 parts of the EEF carbon, and, further, 0.5 part of 3-methacryloxypropyltrimethoxysilane (trade name "Dynasylan® MEMO," made by Evonik Industries, silane coupling agent) was added. The obtained cross-linkable rubber composition was evaluated in the same manner as in Example 1. The results thus obtained are shown in Table 1.

Example 12

A cross-linkable rubber composition was obtained in the same manner as in Example 11 except that the amount of silica (trade name "Carplex® #1120," made by Evonik Industries) was changed to 80 parts, and the obtained cross-linkable rubber composition was evaluated in the same manner as in Example 11. The results thus obtained are shown in Table 1.

Comparative Examples 1 to 4

Cross-linkable rubber compositions were obtained in the same manner as in Example 1 except that the nitrile group-containing highly saturated copolymer rubbers (A8) to (A11) obtained in Synthesis Examples 8 to 11 were used in place of the nitrile group-containing highly saturated copolymer rubber (A1) obtained in Synthesis Example 1, and the obtained cross-linkable rubber compositions were evaluated in the same manner as in Example 1. The results thus obtained are shown in Table 1.

TABLE 1

| | | Example | | | | | | | | | | | | Comparative Example | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 | 3 | 4 |
| Nitrile group-containing highly saturated copolymer rubber | | (A1) | (A2) | (A3) | (A4) | (A5) | (A6) | (A7) | (A1) | (A1) | (A1) | (A1) | (A1) | (A8) | (A9) | (A10) | (A11) |
| Acrylonitrile unit | (wt %) | 19 | 19 | 19 | 19 | 12 | 36 | 19 | 19 | 19 | 19 | 19 | 19 | 19 | 19 | 8 | 45 |
| n-Butyl acrylate unit | (wt %) | 34 | 34 | 34 | 34 | 45 | 10 | | 34 | 34 | 34 | 34 | 34 | 34 | 34 | 27 | 43 |

TABLE 1-continued

|  |  | Example | | | | | | | | | | | | Comparative Example | | | |
|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 1 | 2 | 3 | 4 |
| Methoxyethyl acrylate unit | (wt %) |  |  |  |  |  |  | 34 |  |  |  |  |  |  |  |  |  |
| 1,3-Butadiene unit (including hydrogenated fraction) | (wt %) | 47 | 47 | 47 | 47 | 43 | 54 | 47 | 47 | 47 | 47 | 47 | 47 | 47 | 47 | 65 | 12 |
| Iodine value |  | 50 | 40 | 60 | 80 | 50 | 54 | 50 | 50 | 50 | 50 | 50 | 50 | 20 | 90 | 50 | 50 |
| Composition of cross-linkable rubber composition |  |  |  |  |  |  |  |  |  |  |  |  |  |  |  |  |  |
| Nitrile group-containing highly saturated copolymer rubber | (parts) | 100 | 100 | 100 | 100 | 100 | 100 | 100 | 100 | 100 | 100 | 100 | 100 | 100 | 100 | 100 | 100 |
| FEF carbon black (parts) | (parts) | 50 | 50 | 50 | 50 | 50 | 50 | 50 | 50 | 50 | 80 |  |  | 50 | 50 | 50 | 50 |
| Silica (CARPLEX(R) #1120) |  |  |  |  |  |  |  |  |  |  |  | 50 | 80 |  |  |  |  |
| Adipic acid ether ester-based plasticizer (RS-107) | (parts) | 5 | 5 | 5 | 5 | 5 | 5 | 5 |  |  | 5 | 5 | 5 | 5 | 5 | 5 | 5 |
| Polyether ester-based plasticizer (RS-700) | (parts) |  |  |  |  |  |  |  | 5 |  |  |  |  |  |  |  |  |
| Polyether ester-based plasticizer (RS-735) | (parts) |  |  |  |  |  |  |  |  | 5 |  |  |  |  |  |  |  |
| Stearic acid | (parts) | 1 | 1 | 1 | 1 | 1 | 1 | 1 | 1 | 1 | 1 | 1 | 1 | 1 | 1 | 1 | 1 |
| Zinc flower | (parts) | 5 | 5 | 5 | 5 | 5 | 5 | 5 | 5 | 5 | 5 | 5 | 5 | 5 | 5 | 5 | 5 |
| Antiaging agent (Nocrac CD) | (parts) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Antiaging agent (Nocrac MBZ) | (parts) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| 3-Methacryloxypropyl-trimethoxysilane | (parts) |  |  |  |  |  |  |  |  |  |  | 0.5 | 0.5 |  |  |  |  |
| Organic peroxide cross-linking agent (VulCup(R) 40KE) | (parts) | 6 | 6 | 6 | 6 | 6 | 6 | 6 | 6 | 6 | 6 | 6 | 6 | 6 | 6 | 6 | 6 |
| Evaluation |  |  |  |  |  |  |  |  |  |  |  |  |  |  |  |  |  |
| Tensile strength | (MPa) | 23.7 | 23.9 | 23.8 | 21.5 | 22.5 | 27.2 | 24.5 | 24.7 | 24.5 | 20.6 | 23.0 | 20.1 | 25.2 | 22.5 | 21.2 | 27.4 |
| Elongation | (%) | 270 | 280 | 280 | 290 | 250 | 310 | 250 | 290 | 280 | 170 | 390 | 250 | 280 | 290 | 240 | 250 |
| Heat aging resistance (Elongation change after heat aging) | (%) | −12 | −11 | −14 | −18 | −11 | −12 | −10 | −9 | −7 | −10 | −11 | −9 | −6 | −36 | −13 | −12 |
| TR10 | (° C.) | −42 | −41 | −42 | −41 | −43 | −33 | −36 | −39 | −38 | −43 | −42 | −41 | −39 | −38 | −33 | −21 |
| TR70 | (° C.) | −25 | −23 | −24 | −24 | −26 | −18 | −20 | −24 | −23 | −25 | −25 | −24 | −16 | −15 | −10 | 3 |
| TR70-TR10 | (° C.) | 17 | 18 | 18 | 17 | 17 | 15 | 16 | 15 | 15 | 18 | 17 | 17 | 23 | 23 | 23 | 24 |
| Compression set | (%) | 21 | 26 | 23 | 27 | 22 | 25 | 27 | 27 | 27 | 24 | 32 | 34 | 28 | 31 | 22 | 29 |

As can be seen from Table 1, cross-linked rubbers obtained by using nitrile group-containing highly saturated copolymer rubbers comprising the α,β-ethylenically unsaturated nitrile monomer unit (a1) in a content of 10 to 40 wt %, the α,β-ethylenically unsaturated monocarboxylic acid ester monomer unit (a2) in a content of 10 to 60 wt %, and the conjugated diene monomer unit (a3) in a content of 20 to 70 wt %, and having an iodine value of 35 to 85 were good in original state physical properties, excellent in heat resistance and compression set resistance, and, moreover, excellent in cold resistance (T10 was sufficiently low, and TR70-TR10 was small) (Examples 1 to 12).

On the other hand, when a nitrile group-containing highly saturated copolymer rubber having an iodine value of less than 35 was used, and when a nitrile group-containing highly saturated copolymer rubber having an iodine value of more than 85 was used, the obtained cross-linked rubbers were high in TR70 and large in TR70-TR10 and thus resulted in inferior cold resistance (Comparative Examples 1 and 2).

When a nitrile group-containing highly saturated copolymer rubber comprising the α,β-ethylenically unsaturated nitrile monomer unit (a1) in a content of less than 10 wt % was used, the obtained cross-linked rubber was high in TR70 and large in TR70-TR10 and thus resulted in inferior cold resistance (Comparative Example 3).

Further, when a nitrile group-containing highly saturated copolymer rubber comprising the α,β-ethylenically unsaturated nitrile monomer unit (a1) in a content of more than 45 wt % and the conjugated diene monomer unit (a3) in a content of less than 20 wt % was used, the obtained cross-linked rubber was high in both TR10 and TR70 and large in TR70-TR10 and thus resulted in inferior cold resistance (Comparative Example 4).

The invention claimed is:

1. A cross-linkable rubber composition comprising a nitrile group-containing highly saturated copolymer rubber and a cross-linking agent,
   the nitrile group-containing highly saturated copolymer rubber comprising an α,β-ethylenically unsaturated nitrile monomer unit (a1) in a content of 10 to 30 wt %, an α,β-ethylenically unsaturated monocarboxylic acid ester monomer unit (a2) in a content of 25 to 45 wt %, and a conjugated diene monomer unit (a3) in a content of 40 to 60 wt %, and having an iodine value of 35 to 85, wherein the cross-linking agent is an organic peroxide cross-linking agent.

2. The cross-linkable rubber composition according to claim 1, wherein the α,β-ethylenically unsaturated monocarboxylic acid ester monomer unit (a2) is a n-butyl acrylate unit and/or a methoxyethyl acrylate unit.

3. The cross-linkable rubber composition according to claim 1, further comprising a plasticizer.

4. The cross-linkable rubber composition according to claim 3, wherein the plasticizer is an adipic acid ether ester-based plasticizer and/or a polyether ester-based plasticizer.

5. The cross-linkable rubber composition according to claim 3, wherein a content of the plasticizer is 3 to 30 parts by weight in relation to 100 parts by weight of the nitrile group-containing highly saturated copolymer rubber.

6. The cross-linkable rubber composition according to claim 1, further comprising a reinforcing agent.

7. The cross-linkable rubber composition according to claim 6, wherein the reinforcing agent is carbon black and/or silica.

8. The cross-linkable rubber composition according to claim 6, wherein a content of the reinforcing agent is 5 to 300 parts by weight in relation to 100 parts by weight of the nitrile group-containing highly saturated copolymer rubber.

9. A cross-linked rubber obtained by cross-linking the cross-linkable rubber composition according to claim 1.

10. A shock absorber seal comprising the cross-linked rubber according to claim 9.

11. The cross-linkable rubber composition according to claim 1, wherein the α,β-ethylenically unsaturated nitrile monomer unit (a1) content is 15 to 25 wt %, the α,β-ethylenically unsaturated monocarboxylic acid ester monomer unit (a2) content is 30 to 40 wt %, and the conjugated diene monomer unit (a3) content is 40 to 50 wt %.

12. The cross-linkable rubber composition according to claim 1, wherein the iodine value is 40 to 70.

13. The cross-linkable rubber composition according to claim 1, wherein the iodine value is 40 to 60.

14. The cross-linkable rubber composition according to claim 1, wherein the α,β-ethylenically unsaturated nitrile monomer is acrylonitrile or methacrylonitrile.

15. The cross-linkable rubber composition according to claim 1, wherein the α,β-ethylenically unsaturated monocarboxylic acid ester monomer is n-butyl acrylate or methoxyethyl acrylate.

16. The cross-linkable rubber composition according to claim 1, wherein the conjugated diene monomer is 1,3-butadiene.

17. The cross-linkable rubber composition according to claim 1, wherein a cross-linked rubber obtained from the cross-linkable rubber composition has a TR70-TR10 of 21° C. or less, wherein TR10 is the temperature at which the length of a test piece is contracted (recovered) by 10% due to the temperature increase after the cross-linked rubber is frozen (the temperature at which a low-temperature elasticity recovery of 10% is exhibited), and TR70 is the temperature at which the length of a test piece is contracted (recovered) by 70% due to the temperature increase after the cross-linked rubber is frozen (the temperature at which a low-temperature elasticity recovery of 70% is exhibited).

18. The cross-linkable rubber composition according to claim 17, wherein TR70-TR10 is 19° C. or less.

19. The cross-linked rubber according to claim 9, wherein TR-10 is 36° C. or less.

20. The cross-linkable rubber composition according to claim 1, wherein monomer unit(s) of other copolymerizable monomers are present in a content of 10 wt % or less, including 0.

* * * * *